(12) United States Patent
Yahav (10) Patent No.: US 8,593,507 B2
(45) Date of Patent: Nov. 26, 2013

(54) ROLLING CAMERA SYSTEM

(75) Inventor: Giora Yahav, Haifa (IL)

(73) Assignee: Microsoft International Holdings B.V., Amsterdam (NL)

( * ) Notice: Subject to any disclaimer, the term of this patent is extended or adjusted under 35 U.S.C. 154(b) by 255 days.

(21) Appl. No.: 13/057,265

(22) PCT Filed: Aug. 3, 2008

(86) PCT No.: PCT/IL2008/001063
§ 371 (c)(1),
(2), (4) Date: Feb. 2, 2011

(87) PCT Pub. No.: WO2010/016047
PCT Pub. Date: Feb. 11, 2010

(65) Prior Publication Data
US 2011/0134222 A1    Jun. 9, 2011

(51) Int. Cl.
*H04N 13/02* (2006.01)
*G03B 21/00* (2006.01)
(52) U.S. Cl.
USPC ............................................ 348/46; 353/122
(58) Field of Classification Search
USPC ............ 348/46, E13.074, 301, 308, 302, 296, 348/297, 263; 356/4.01; 250/559.08, 332; 353/122
See application file for complete search history.

(56) References Cited

U.S. PATENT DOCUMENTS

| | | | |
|---|---|---|---|
| 6,191,845 B1 | 2/2001 | Hayashi | |
| 6,373,557 B1 | 4/2002 | Mengel et al. | |
| 7,224,384 B1 * | 5/2007 | Iddan et al. | 348/207.99 |
| 7,777,796 B2 | 8/2010 | Inoue et al. | |
| 2005/0285971 A1 | 12/2005 | Stavely | |
| 2007/0091175 A1 * | 4/2007 | Iddan et al. | 348/135 |

FOREIGN PATENT DOCUMENTS

| | | |
|---|---|---|
| JP | 2007178314 A | 7/2007 |
| WO | WO 00/19705 A | 9/1998 |
| WO | WO01/18563 A | 3/2001 |
| WO | WO02/49367 A | 6/2002 |
| WO | WO2005/072358 A | 8/2005 |
| WO | WO2006/130734 A2 | 12/2006 |

OTHER PUBLICATIONS

Response to Communication Pursuant to Rules 161(1) and 162 EPC dated Apr. 5, 2011, European Patent Application No. 08789739.3 filed Aug. 3, 2008.
Chinese Office Action dated Aug. 30, 2012, Chinese Patent Application No. 200880130678.4.

(Continued)

*Primary Examiner* — Dave Czekaj
*Assistant Examiner* — Dramos I Kalapodas
(74) *Attorney, Agent, or Firm* — Vierra Magen Marcus LLP (57) ABSTRACT

A 3D imaging system comprising: first and second rolling shutter photosurfaces having pixels; a first shutter operable to gate on and off the first photosurface; a light source controllable to transmit a train of light pulses to illuminate a scene; a controller that controls the first shutter to gate the first photosurface on and off responsive to transmission times of the light pulses and opens and closes bands of pixels in the photosurfaces to register light reflected from the light pulses by the scene that reach the 3D imaging system during periods when the first photosurface is gated on; and a processor that determines distances to the scene responsive to amounts of light registered by pixels in the photosurfaces.

20 Claims, 4 Drawing Sheets

(56) References Cited

OTHER PUBLICATIONS

Toyama, Kentaro, et al., "Probabilistic Tracking in a Metric Space," Eighth International Conference on Computer Vision, Vancouver, Canada, vol. 2, Jul. 2001, 8 pages.
International Search Report & The Written Opinion of the International Searching Authority dated Oct. 21, 2008, International Application No. PCT/IL2008/001063 filed Aug. 3, 2008.
Kawakita, et al., "Axi-vision camera: a three-dimension camera," Proceedings of the SPIE—The International Society for Optical Engineering, vol. 3958. Jan. 1, 2000, pp. 61-70.
English Abstract of Japanese Publication No. JP2007178314 (A) published on Jul. 12, 2007.
Response to Office Action dated Dec. 5, 2011, European Patent Application No. 08789739.3.
Response to Office Action dated Jan. 6, 2013, Chinese Patent Application No. 200880130678.4.
English translation of Arguments and Amended Claims as filed in Response to Office Action dated Jan. 6, 2013, Chinese Patent Application No. 200880130678.4.
European Office Action dated Sep. 15, 2011, European Patent Application No. 08789739.3-1241.
Response to Office Action dated May 24, 2013, Chinese Patent Application No. 200880130678.4.
English Summary of the Arguments filed with Response to Office Action dated May 24, 2013, Chinese Patent Application No. 200880130678.4.
English translation of Amendments filed in Response to Office Action dated May 24, 2013, Chinese Patent Application No. 200880130678.4.
Japanese Office Action dated Jun. 24, 2013, Japanese Patent Application No. JP 2011-521680.
Chinese Office Action dated Mar. 29, 2013, Chinese Patent Application No. 200880130678.4.
Response to Office Action dated Sep. 11, 2013, Japanese Patent Application No. JP 2011-521680.

\* cited by examiner

ROLLING CAMERA SYSTEM

FIELD

This invention relates to imaging, and more particularly to cameras that provide an image of a scene and measurements of distances to regions in the scene.

BACKGROUND

Three dimensional or "3D" cameras provide distance measurements to features in a scene being imaged. 3D cameras are used for many different applications in which it is desired to image objects as a function of distance, such as profile inspection of manufactured goods, medical imaging, CAD verification, robot vision, geographic surveying, and film production special effects.

In one method of obtaining a three-dimensional image, known as "time of flight", one or more light pulses are radiated from a light source towards a scene of interest. The radiated light pulses are generally a non-visible light, such as infrared (IR). The light pulses reflect off the various objects in the scene. A portion of each of the reflected pulses returns to the 3D camera. The time it takes for light to return from an object to a camera is used to determine distance to the object. Light pulses that reflect off objects closer to the camera return to the camera sooner than those that reflect off objects located farther away.

3D cameras used for time of flight measurements generally contain both a light sensitive surface (hereinafter called a "photosurface" or "photosensitive surface") and a gating means for gating the photosurface on or off. For each radiated light pulse, following an accurately predetermined delay from a time the light pulse is radiated, the camera is gated on for a period of time, hereinafter called a "gate". Light pulses reflected from objects in the scene leave an image on the photosurface if they are received by the camera during the gate. Since these light pulses have traveled to the object and back in the known delay time between the radiation of the pulse and the gating on of the gate, and since the speed of light is also known, the distance to the object can be calculated. By repeating this process over a range of gate delay times, distances to features in the scene at different distances from the camera can be obtained.

In some 3D cameras, rather than just considering timing between light pulses and gates, amounts of light registered on the photosurface during the time that the camera is gated on is also used to determine distances to objects in a scene. This approach generally requires taking three measurements of light from the scene.

A "timing" measurement is taken by transmitting a light pulse to the scene, and gating on a photosurface on which the scene is imaged with a relatively short gate that is optionally the width of the light pulse. An amount of light registered on a pixel of the photosurface during the gate is a function of a distance from the camera of a region of the scene imaged on the pixel. The timing measurement is also affected by reflectivity of the region being imaged by the pixel. A high reflectivity region reflects more of the transmitted pulse and a low reflectivity region reflects less of the transmitted pulse. Accordingly, features equidistant from the camera that have differences in reflectivity will appear to be located at different distances from the camera.

Timing measurements can be corrected for differences in reflectivity by taking a second, normalization measurement. This measurement involves transmitting a light pulse and gating a photosurface that images the scene with a relatively long gate, optionally three times the width of the light pulse. The long gate enables the photosurface to register substantially all the light reflected from the light pulse by a region in the scene that reaches the camera. The 3D camera obtains normalized distance measurements by dividing the timing measurement by the normalization measurement for each pixel.

A third measurement measures background light. This is ambient light that is present in the scene, and that is present in the timing and normalization measurements. Since background light does not arise from the reflected light pulses, it makes those measurements less accurate. Background light is measured by gating on the photosurface and recording light that registers on the photosurface, when light from a transmitted light pulse is not present. To make the correction, the 3D camera subtracts the background light measurement from the timing and normalization measurements for each pixel.

Generally, a plurality of photosurfaces are used to acquire the various measurements. In some 3D cameras, three photosurfaces are used, a different one for each of the timing, normalization, and background measurements.

3D cameras are often used as components of imaging systems (hereinafter called "3D imaging systems"), which acquire and/or display a picture of a scene being imaged along with distance information to features in the scene. Some 3D imaging systems use a photosurface in addition to those used for providing distance measurements to record the picture of the scene being imaged. Such systems therefore may have four photosurfaces, one for the picture of the scene and one for each of the timing, normalization, and background data needed to calculate distances to features in the scene.

The photosurfaces used in 3D imaging systems use other types of components such as gating means or shutters, filters, and optical devices of varying complexity. Gating means may include, for example, electro-optical shutters or gated image intensifiers. IR filters are commonly used with imaging photosurfaces to prevent distortion of the images they record by infrared light. Other filters may be used, for example, to pass only infrared light to a distance-measuring photosurface. Optical devices include such items as beam splitters, various lenses for refocusing or relaying light, irises, and prisms.

Examples of gated 3D imaging systems that use amounts of light registered on pixels to determine distances to features in a scene are shown in PCT Publication WO 01/18563, the disclosure of which is incorporated herein by reference. Each of the configurations shown include both a video camera or photosurface to provide an image of the scene, and three other photosurfaces, labeled "D", "B", and "N", to provide distance (i.e. timing), background, and normalization information respectively. In FIG. 1 of PCT Publication WO 01/18563 the system includes a beam splitter, two refocusing lens systems, a three-way prism, and a separate shutter for each photosurface. In the same patent, the configuration of FIG. 3 uses a four-way prism to split and direct incoming light.

SUMMARY

An aspect of some embodiments of the invention relates to providing an improved 3D imaging system, for acquiring distance maps and pictures of a scene.

According to an aspect of some embodiments of the invention, at least one rolling shutter photosurface is used to image a scene and to determine distances to features of the scene.

Rolling shutter photosurfaces are commonly used in many conventional cameras, and are relatively inexpensive. A rolling shutter sequentially gates on and off bands of pixels in the photosurface to register light from, and acquire, an image of a scene. Generally, each pixel band is gated on to be sensitive to light following a delay period, hereinafter a "read time", after gating on a preceding pixel band. The read time is a time required to read amounts of light registered by pixels in the preceding pixel band during the time that the preceding pixel band was gated on. In this way the gated pixels move or "roll" across the photosurface until the entire photosurface is exposed to the scene. For convenience of presentation, gating on a band of pixel by the rolling shutter is referred to as "opening" the pixel band and gating off the band of pixels by the rolling shutter is referred to as "closing" the pixel band.

The inventors have determined that the relatively inexpensive and simple rolling shutter photosurfaces typically used in digital cameras can be appropriately gated in accordance with an embodiment of the invention to acquire depth maps of scenes. The use of rolling shutter photosurfaces in a 3D imaging system in accordance with an embodiment of the invention provides a relatively simple and inexpensive 3D imaging system that acquires both an image of a scene and a depth map of a scene.

In accordance with some embodiments of the invention, the 3D imaging system comprises first and second bore sighted rolling shutter photosurfaces shuttered, by optionally "global" first and second shutters respectively. Each global shutter is controllable to block and unblock transmission of light to substantially all of the area of its respective photosurface and thereby gate the photosurface on and off. For convenience of presentation, blocking and unblocking light to a photosurface with a global shutter is referred to respectively as "gating off" and "gating on" the photosurface. It is noted that the terminology "gating off" and "gating on" used for a global shutter distinguishes operation of the global shutter from that of a rolling shutter, for which "closing" and "opening" are used for gating off and on bands of pixels. Optionally, the first and second photosurfaces are RGB photosurfaces. Optionally, the first photosurface is shielded by a narrow band pass filter that transmits light having a wavelength substantially only in a relatively narrow band of IR wavelengths.

To acquire a 3D map of a scene and an image of the scene, in accordance with an embodiment of the invention, a train of IR light pulses having a wavelength that is passed by the IR band pass filter is transmitted to illuminate the scene. During transmission of the pulse train, each rolling shutter photosurface is operated in a rolling shutter exposure mode, in which pixel bands in the photosurface are sequentially opened and closed to expose the photosurface to light that passes through the photosurface's associated global shutter. However, in accordance with an embodiment of the invention, homologous bands of pixels in the first and second photosurfaces are turned on and off substantially simultaneously. And, following transmission of each light pulse in the pulse train, the first global shutter is controlled to gate on the first photosurface for a relatively short "timing" gate. During the timing gate, pixels in an "open" band of pixels in the first shutter acquire distance information for the scene. In addition, optionally following transmission of each light pulse, the second global shutter is controlled to gate on the second photosurface for a relatively long "normalization" gate. During the normalization gate, pixels in an open band of pixels in the second photosurface acquire data for normalizing the distance data acquired by homologous pixels in the first photosurface. Because homologous bands of pixels in the first and second photosurfaces are open substantially simultaneously, normalization data and timing data are acquired substantially simultaneously.

Optionally, following acquisition of timing and normalization data, the first and second global shutters are controlled to respectively gate on the first and second rolling shutter photosurfaces for at least one background gate. During the at least one background gate, each rolling shutter photosurface is exposed to light from the scene when no light from pulses of IR light transmitted to illuminate the scene to acquire timing and/or normalization data reaches the 3D imaging system. The first photosurface, which is shielded by the IR band pass filter, thus registers background IR light, and the second photosurface registers RGB and background IR light from the scene.

In accordance with an embodiment of the invention, data acquired by the first and second photosurfaces during the timing and normalization gates respectively, and data acquired by the first and second photosurfaces when no light from IR pulses that illuminate the scene reach the 3D system, is used to provide a depth map of the scene. The data acquired by the second photosurface and optionally the first photosurface when no light from the IR pulses reaches the 3D imaging system is used to provide an RGB image of the scene.

There is therefore provided in accordance with an embodiment of the invention, a 3D imaging system comprising: first and second rolling shutter photosurfaces having pixels; a first shutter operable to gate on and off the first photosurface; a light source controllable to transmit a train of light pulses to illuminate a scene; a controller that controls the first shutter to gate the first photosurface on and off responsive to transmission times of the light pulses and opens and closes bands of pixels in the photosurfaces to register light reflected from the light pulses by the scene; and a processor that determines distances to the scene responsive to amounts of light registered by pixels in the photosurfaces.

Optionally, the controller opens and closes bands of pixels in the first and second photosurfaces to register light that reaches the 3D camera from same transmitted light pulses. Additionally or alternatively, the controller optionally controls the shutter to gate on and off the first photosurface, and turns on and off bands of pixels in the first photosurface to register light from the scene during periods of time for which light from the light pulses does not reach the 3D imaging system.

In some embodiments of the invention, the processor determines distance to a region of the scene responsive to an amount of light reflected from the light pulses by the region and registered by the first photosurface minus an amount of light registered by the first photosurface during a period of time for which light from the light pulses does not reach the 3D imaging system. Additionally or alternatively, the controller optionally turns on and off bands of pixels in the second photosurface to register light from the scene during periods, of time for which light from the light pulses does not reach the 3D imaging system. Additionally or alternatively, the controller optionally turns on and off bands of pixels in the second photosurface to register light from the scene during periods of time for which light from the light pulses does not reach the 3D imaging system. Optionally, the controller turns on and off bands of pixels in the first and second photosurface to register light from the scene during same periods of time for which light from the light pulses does not reach the 3D imaging system. Optionally, the processor provides an image of the scene responsive substantially only to an amount of light from the scene registered by the second photosurface during periods of time for which light from the light pulses does not reach the 3D imaging system. Additionally or alternatively, the processor optionally provides an image of the scene responsive substantially only to an amount of light from the scene registered by the second photosurface during periods of time for which light from the light pulses does not reach the 3D imaging system minus an amount of light registered by the first photosurface during periods of time for which light from the light pulses does not reach the 3D imaging system.

In some embodiments of the invention, the processor determines distance to a region of the scene responsive to an amount of light reflected from the light pulses by the region and registered by the second photosurface minus an amount of light registered by the second photosurface during periods of time for which light from the light pulses does not reach the 3D imaging system.

In some embodiments of the invention, the 3D imaging system comprises a second shutter operable to gate on and off the second photosurface.

In some embodiments of the invention, the first photosurface is sensitive substantially only to light in a narrow band of light waves. Optionally, the light to which the first photosurface is sensitive is IR light. Additionally or alternatively, the second photosurface is optionally sensitive to light in the narrow band of light waves. Optionally, the second photosurface is sensitive to RGB light.

There is further provided in accordance with an embodiment of the invention, method of 3D imaging a scene, the method comprising: transmitting a train of light pulse to illuminate the scene; gating a rolling shutter photosurface on and off responsive to times at which light pulses in the train of light pulses are transmitted to register light reflected from the light pulses by the scene; imaging the scene with an additional photosurface; and using light registered by the rolling shutter photosurface and the additional photosurface to provide a depth map of the scene and an image of the scene.

BRIEF DESCRIPTION OF FIGURES

The invention will be more clearly understood by reference to the following description of embodiments thereof read in conjunction with the figures attached hereto. In the figures, identical structures, elements or parts that appear in more than one figure are labeled with the same numeral in all the figures in which they appear. Dimensions of components and features shown in the figures are chosen for convenience and clarity of presentation and are not necessarily shown to scale. The figures are listed below.

DETAILED DESCRIPTION OF EMBODIMENTS

Figure 1A:
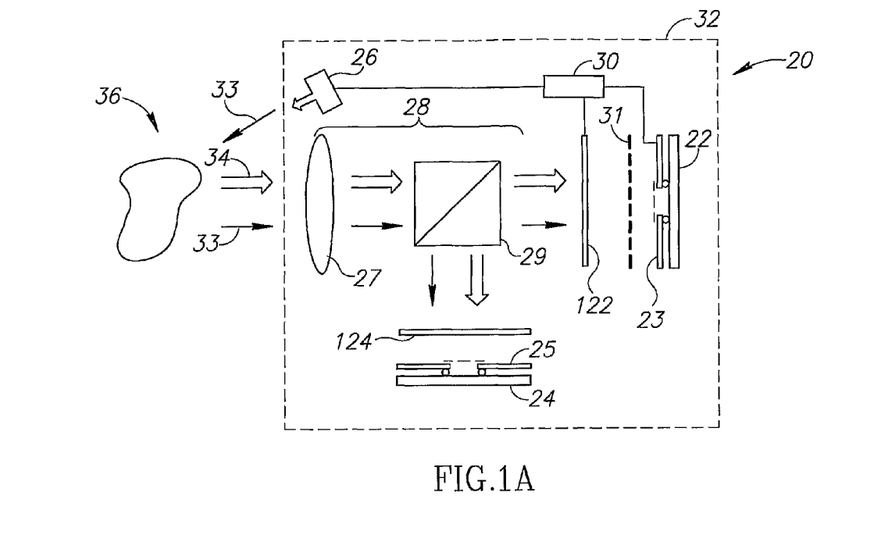
FIG. 1A is a schematic view of a 3D imaging system comprising two rolling shutter photosurfaces, in accordance with an embodiment of the invention.

FIG. 1A shows a schematic 3D imaging system 20, in accordance with an embodiment of the invention. 3D imaging system 20 optionally comprises a first rolling shutter photosurface 22, a second rolling shutter photosurface 24, a controllable light source 26, optics 28, and a controller 30. Photosurface 22 is shuttered by a global shutter 122 and photosurface 24 is shuttered by a global shutter 124. Optionally, shutter 124 is omitted and photosurface 24 is unshuttered by a global shutter. Controller 30 connects to both shutters, but for clarity only the connection to shutter 122 is shown in FIG. 1A.

Global shutters 122 and 124 are controllable to block and unblock transmission of light to photosurfaces 22 and 24, respectively. Whereas shutters 122 and 124 are schematically shown as separate from the photosurfaces that they shutter they may be any suitable shutter known in the art and may be integrated with the photosurfaces. Global shutter 122 is a fast shutter capable of gating optionally at nanosecond, or faster, speeds. Global shutter 124 optionally gates on and off more slowly, and may for example gate on and off in about a millisecond. As, generally, a fast shutter is not required to shutter photosurface 124, in some embodiments of the invention, a global shutter, such as shutter 124, is not required to shutter the photosurface. Shuttering the photosurface for providing distance measurements is accomplished by opening and closing bands of pixels using the rolling shutter function of the photosurface. Photosurfaces 22 and 24 are optionally homologous. In homologous photosurfaces pixels corresponding to a same relative position on each photosurface receive light from substantially a same region of the scene. The components of 3D imaging system 20 are optionally located inside a same housing schematically represented by a dashed border 32.

First rolling shutter photosurface 22 comprises pixels sensitive, optionally, substantially only to IR light. FIG. 1A shows an IR filter 31 in front of photosurface 22, to illustrate schematically that only IR light registers on the pixels of that photosurface. Second rolling shutter photosurface 24 comprises pixels sensitive to IR light and visible light. The visible light sensitivity may be to color (RGB) or to black & white. IR light in FIG. 1A is schematically represented by single line arrows 33 and visible light by block arrows 34.

The pixels are generally arranged in a rectangular array on photosurfaces 22 and 24, but other arrangements are also contemplated according to some embodiments of the invention. The size of the array in pixels, as well as the size of the individual pixels themselves can vary as needed for a particular application. Generally, the array should be sized sufficiently large and individual pixels sized sufficiently small to provide a desired range of fields of view and image resolution.

Light source 26 is controllable to transmit at least one, and generally a train of IR, light pulses, schematically represented by an arrow 33, to illuminate a scene 36. Controller 30 controls light source 26 to stop or start the transmission of light pulses. Optics 28 collects light from scene 36 and focuses the collected light on the photosurfaces. Optics 28 optionally comprises a lens or lens system represented by a lens 27, and a beam splitter 29.

IR light 33 reflects off features in scene 36 and returns to 3D imaging system 20 along with visible light 34. Both types of light pass through optics 28, and the optics directs, optionally, half of the light to each of photosurfaces 22 and 24. 3D imaging system 20 uses data obtained from the light that is incident on the photosurfaces to determine a distance map (hereinafter also called "depth map") of scene 36 and provide a picture of the scene, in accordance with an embodiment of the invention.

The term "rolling shutter" refers to the functional capability of the photosurface to selectively open and close bands of pixels on the photosurface. In FIG. 1A, rolling shutters for each of the photosurfaces are represented schematically by "rolling" diaphragms 23 and 25. Controller 30 connects to both rolling shutters, but for clarity only the connection to rolling shutter 23 is shown in FIG. 1A.

Figure 1B:
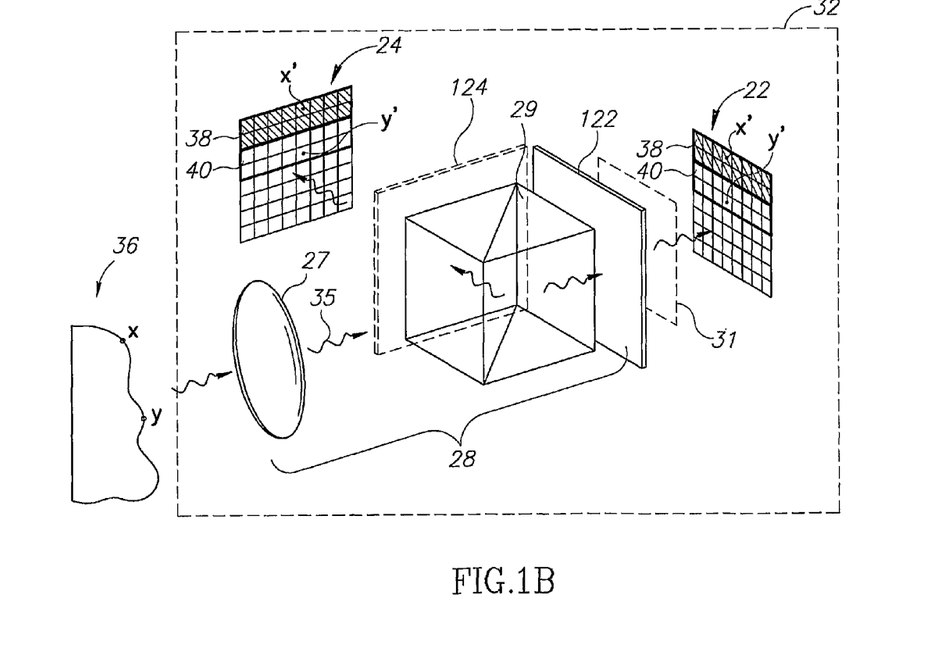
FIG. 1B is a schematic perspective view of the 3D imaging system of FIG. 1A, in accordance with an embodiment of the invention.

FIG. 1B shows a schematic perspective representation of 3D imaging system 20 shown in FIG. 1A, but with shutter 124 shown in dashed lines to illustrate that shutter 124 may optionally be removed and rolling shutter photosurface 24 left ungated by a global shutter. For clarity, light source 26 and controller 30 are not shown in FIG. 1B. FIG. 1B shows the array of pixels on each photosurface, and shows a light wave, schematically represented by a wavy arrow 35, from scene 36 passing through lens 27, beam splitter 29, and global shutters 122 and 124 to impinge on photosurfaces 22 and 24.

At a time at which 3D imaging system 20 is shown in FIG. 1B, each rolling shutter photosurface 22 and 24 has an open band 38, shown shaded, of pixels comprising two top rows of the photosurface. Following a read time required to read amounts of light registered by pixels in a band of pixels, the rolling shutter photosurfaces opens a next "pair" of homologous bands 40 of pixels, and continues until substantially all of each photosurface 22 and 24 has been exposed to light from scene 36. A sample region X in scene 36 is imaged on a pixel labeled X' in respective pixel bands 38 when the homologous bands of pixels are open, and a sample point Y is similarly imaged on a pixel labeled Y' in each pixel band 40 of homologous photosurfaces 22 and 24.

Gating of global shutters 122 and 124, and thereby photosurfaces 22 and 24 to acquire a 3D depth map and image of scene 36 is controlled by controller 30. As noted above, controller 30 controls light source 26 to transmit a train of, optionally IR, light pulses 33. In an embodiment of the invention, after a specified delay following each IR light pulse, controller 30 controls global shutter 122 to gate on photosurface 22 for the timing gate. Optionally, for each timing gate, controller 30 also controls shutter 124 to substantially simultaneously gate on photosurface 24, for a normalization gate. In addition, during the period that light pulses 33 are transmitted, pairs of homologous pixel bands in the photosurfaces are simultaneously, sequentially opened by controller 30 to register light reflected by scene 36 from the transmitted pulses during the timing and normalization gates.

Following registration of light during the timing and normalization gates, pixel bands in photosurfaces 22 and 24 are opened and global shutters 122 and 124 are controlled to gate on photosurfaces 22 and 24 for background gates when substantially no light from IR light pulses transmitted by light source 26 reaches imaging system 20. During the background gates therefore, photosurface 22 acquires measurements of IR background and photosurface 24 acquires measurements of IR background and RGB light from scene 36.

Controller 30 is accordingly configured to coordinate light source 26, global shutters 122 and 124, and rolling shutter photosurfaces 22 and 24, so that timing, normalization, and background measurements required to provide distances to features in scene 36, and thereby a depth map of the scene, can be acquired.

Figure 2A:
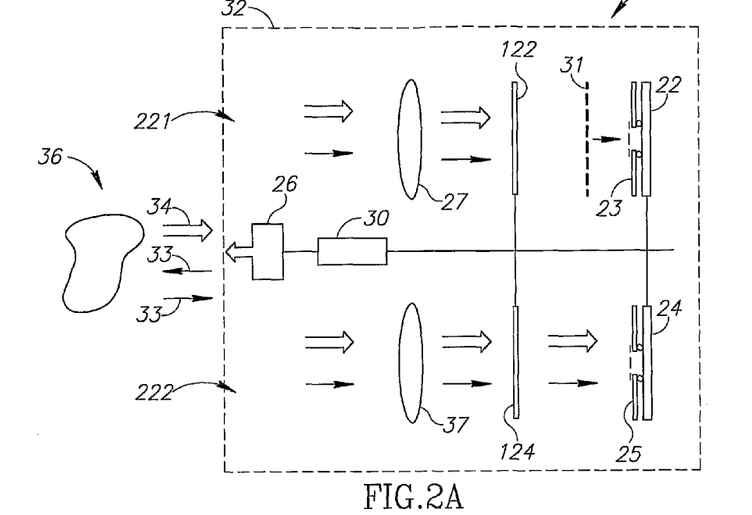
FIG. 2A is a schematic view of a 3D imaging system comprising two rolling shutter photosurfaces, in accordance with an embodiment of the invention.

FIG. 2A shows a schematic plan view of a 3D imaging system 220 in accordance with an embodiment of the invention. The embodiment of FIG. 2A is a "two camera" system, having a first camera 221 comprising lens 27, global shutter 122, IR filter 31, and rolling shutter photosurface 22, and a second camera 222 comprising lens 37, global shutter 124, and rolling shutter photosurface 24. The rolling shutter aspects of photosurfaces 22 and 24 are represented by rolling diaphragms 23 and 25 respectively. Light source 26 transmits at least one IR light pulse 33 to illuminate scene 36, under the control of controller 30. As shown, controller 30 also is connected to and controls global shutters 122 and 124 and rolling shutter 23 of the first camera 221, and shutter 124 and rolling shutter 25 of second camera 222.

Figure 2B:
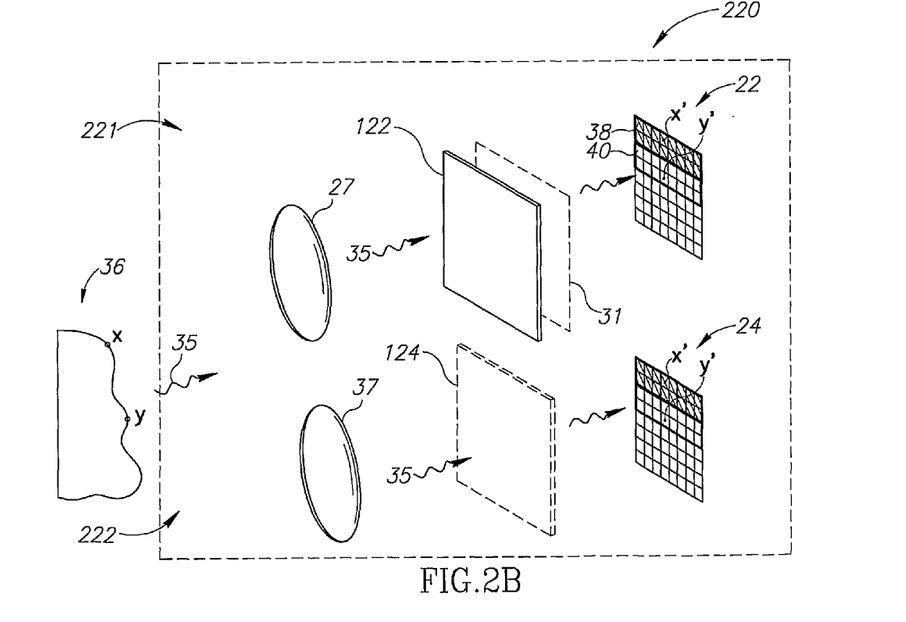
FIG. 2B is a schematic perspective view of the 3D imaging system of FIG. 2A, in accordance with an embodiment of the invention.

FIG. 2B shows a schematic perspective representation of 3D imaging system 220 shown in FIG. 2A, but with shutter 124 shown in dashed line to illustrate that shutter 124 may optionally be removed and rolling shutter photosurface 24 left ungated by a global shutter. For additional clarity, light source 26 and controller 30 are not shown in FIG. 2B.

FIG. 2B shows the array of pixels on each photosurface, and shows a light wave, schematically represented by a wavy arrow 35, from scene 36 passing through lenses 27 and 37. Light passing through lens 27 is shuttered by global shutter 122 and filtered by IR filter 31 so that substantially only IR light impinges on photosurface 24. Light passing through lens 37 is shuttered by global shutter 124, and impinges, unfiltered, on photosurface 24. Similar to the process described in FIG. 1B above, homologous pixel bands 38, 40, and subsequent pixel bands are sequentially opened, following appropriate read times, until substantially all of photosurfaces 22 and 24 have been exposed to light from scene 36. Sample points X and Y image as X' and Y' on pixel bands 38 and 40, respectively, as each homologous band of pixels is exposed.

Figure 3:
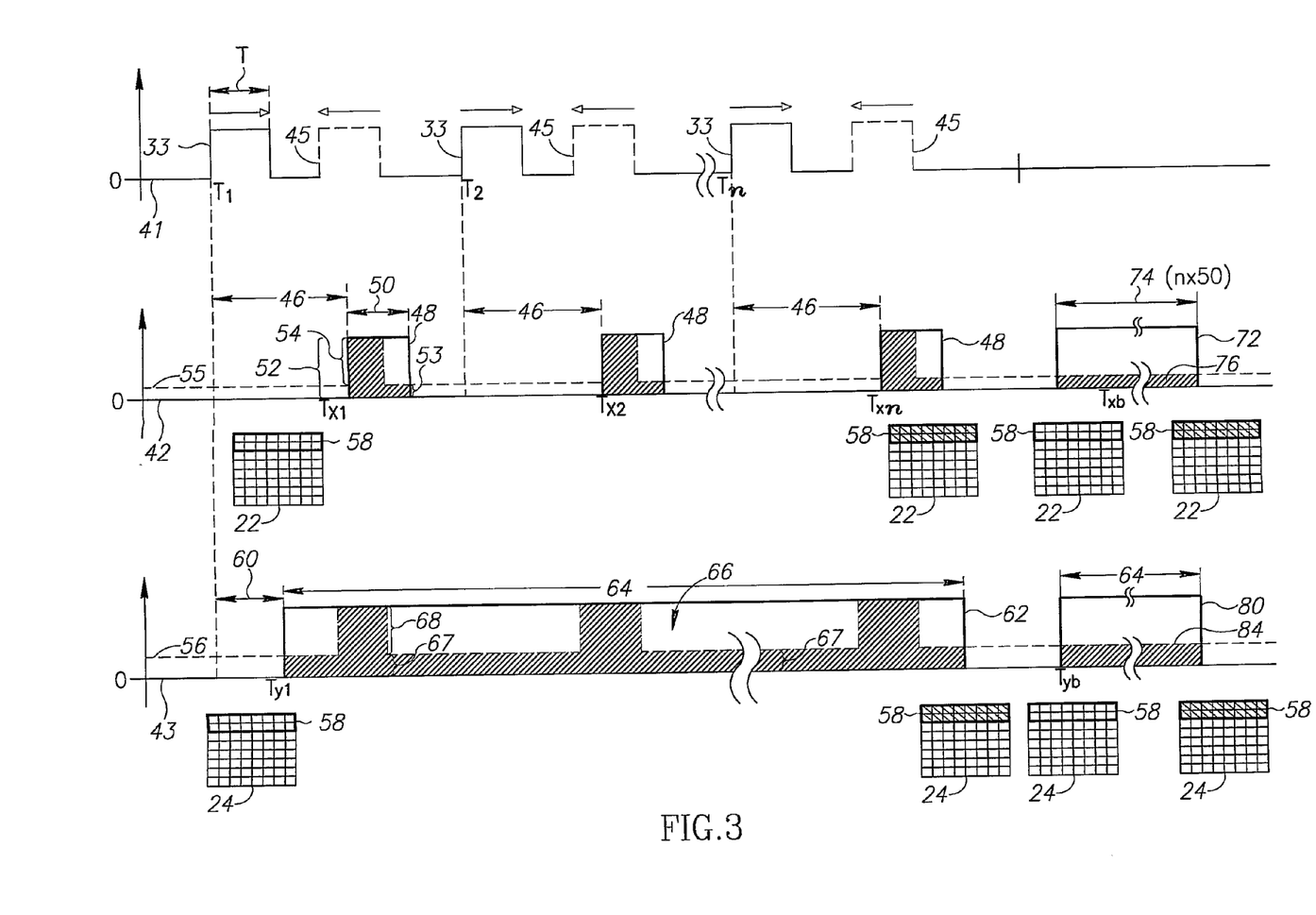
FIG. 3 is a timing diagram of the 3D imaging system of FIG. 1A, in accordance with an embodiment of the invention.
Figure 4:
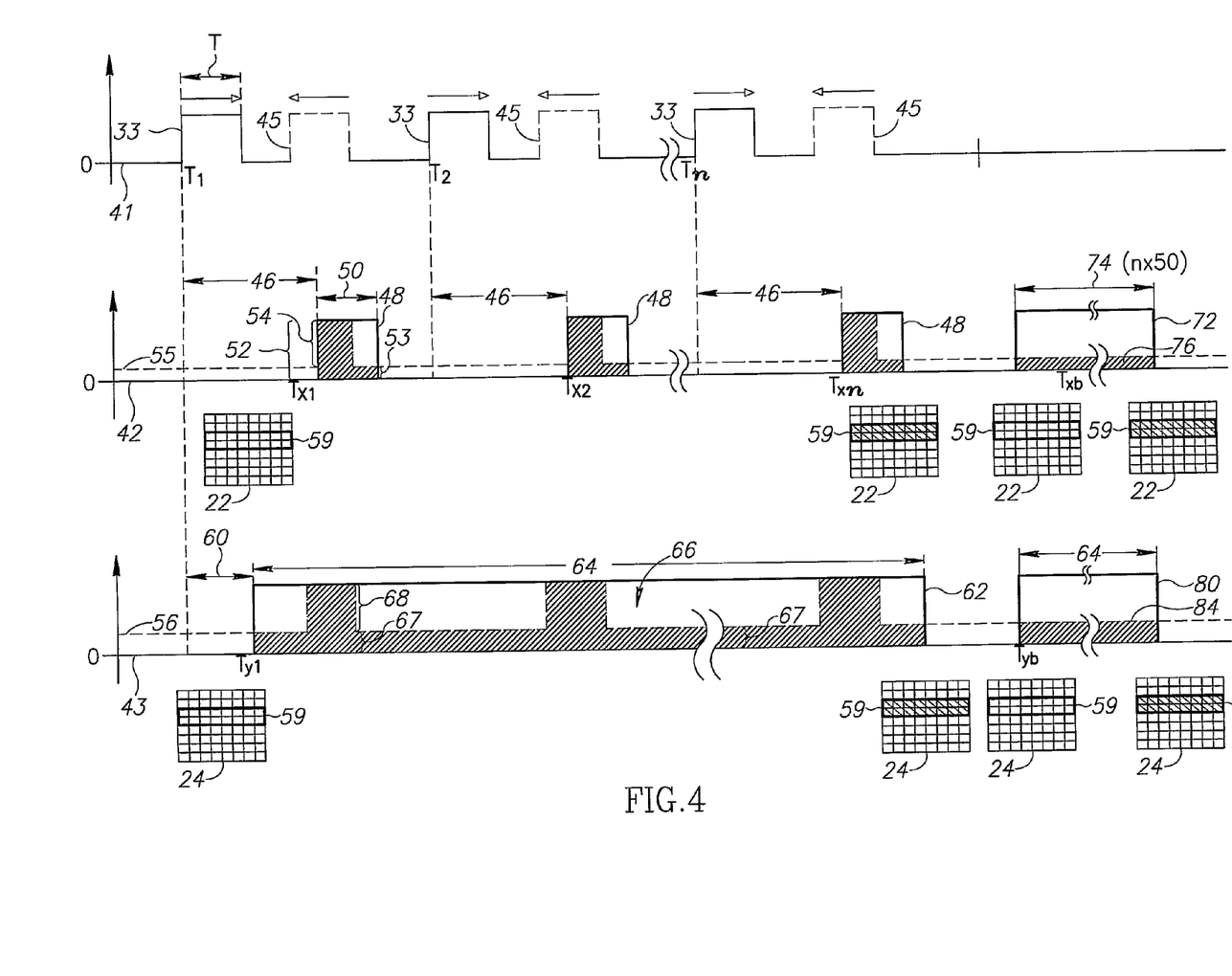
FIG. 4 is a timing diagram of the 3D imaging system of FIG. 1A, in accordance with an embodiment of the invention.

FIGS. 3 and 4 show time graphs, or graphs of time lines, that illustrate gating of photosurfaces 22 and 24 to acquire a depth map of scene 36, in accordance with an embodiment of the invention. Time line 41 schematically illustrates transmission of a train of optionally IR light pulses 33 to illuminate scene 36 at a times $T_1, T_2, \ldots T_n$ and reflections 45 of the light pulses that reach 3D imaging system 20 (or 220). Time lines 42 and 43 schematically represent gating of first and second photosurfaces 22 and 24 respectively, by global shutters 122 and 124 relative to times at which pulses in the train of IR light pulses shown along time line 41 are transmitted and also schematically indicate light that is collected and imaged by each photosurface. For additional clarity, gating of shutters 122 and 124 in time lines 42 and 43, respectively, are shown in bold lines.

Base level 55 along time line 42 is above zero to represent ambient IR background light that reaches 3D imaging system 20 from scene 36. Base level 56 above time line 43 represents background IR light plus visible RGB light that reaches 3D imaging system 20 from scene 36. Since base level 56 in time line 43 includes visible RGB light as well as IR light, it is shown at a higher level than base level 55 in time line 42.

FIG. 3 also includes representations of rolling shutter photosurfaces 22 and 24 to illustrate opening and closing of pixel bands in the photosurfaces so that pixels in the bands can register light transmitted through global shutters 122 and 124, during timing and normalization gates. In this example, the size of a band of pixels exposed by each rolling shutter 23 and 25 is arbitrarily selected to be two rows.

Controller 30 begins the process of obtaining a 3D image of scene 36 by controlling light source 26 to transmit a train of, optionally, IR light pulses 33 to illuminate the scene and optionally turning on pixel bands 58 on each photosurface 22 and 24. Pixel bands 58 are indicated by a bold rectangular border. Pixel bands 58 are open for a period of time during which a plurality of light pulses 33 are transmitted to illuminate scene 36 and for which, following each light pulse, global shutter 122 is controlled to gate on photosurface 22 and 24 for a short gate 48. In this same period of time, shutter 124 is gated on, optionally for a relatively long single continuous gate 62.

In FIG. 3, transmitted light pulse 33 is shown graphically along time line 41 as a train of solid line pulses transmitted at times $T_1, T_2, \ldots T_n$, and having a duration T. The number of pulses "n" in the train can be any number, and in some embodiments are 1,000 or 10,000 pulses. Pulses 45 of light reflected from transmitted light pulses 33 are shown in dashed lines. For convenience of illustration, all light pulses in this example are shown equal in amplitude. Transmitted outgoing light pulses 33 have overhead arrows pointing from left to right, graphically indicating that light pulses are "outgoing" from 3D imaging system 20 (or 220). Reflected light pulses 45 have an overhead arrow pointing from right to left, indicating that the light pulses are incoming to imaging system 20.

As noted above, time line 42 shows gating of photosurface 22 by global shutter 122. After a first predetermined time interval 46 following each light pulse 33, controller 30 gates on global shutter 122 so that light from scene 36 incident on the shutter during a first relatively short "timing" gate 48 is able to pass through the shutter and impinge on photosurface 22. Gates 48 are schematically indicated as having a gate width 50 and beginning at times $T_{X1}, T_{X2} \ldots T_{X3}$ corresponding to light pulse 33 transmission times $T_1, T_2, \ldots T_n$. Time interval 46 and gate width 50 are selected by controller 30 so that light reflected from a transmitted light pulse by features that are present within a predetermined "slice" of scene 36 is captured, at least in part, during first gate 48. Optionally, gate width 50 is substantially equal to pulse width T of transmitted and reflected light pulses 33 and 45.

In FIG. 3, a shaded area 52 within each timing gate 48 represents, by way of example, IR light that registers on a particular pixel of first photosurface 22 during the timing gate. Each pixel on photosurface 22 images a corresponding region in scene 36. Light 52 comprises two parts, background light 53 and reflected light 54. Background light 53 is registered ambient IR light, and reflected light 54 is registered IR light from light pulse 45 reflected from transmitted pulse 33 by a corresponding region in scene 36 imaged on the pixel.

Graphically, background light 53 is a part of registered light 52 that is between the zero line of time line 43 and base level 55. Registered light 54 is a result of a temporal intersection of reflected pulse 45 with timing gate 48, and graphically is a part of registered light 52 above base level 55.

As noted above, pixel band 58 in photosurface 22 is open for a period of time during which a plurality of light pulses 33 are transmitted to illuminate scene 36 and for which, following each transmitted light pulse, global shutter 122 is controlled to gate on photosurface 22 for short gates 48. As a result, during the period that pixel band 58 in photo surface 22 is open, each pixel in the pixel band "accumulates" and registers light e.g. light in reflected light pulses 45, reflected from a plurality of light pulses 33 by a region of scene 36 that is imaged on the pixel.

Photosurface 22 and pixel band 58 are schematically represented prior to pixel band 58 being opened and registering timing information to the left of a first gate 48 along time line 42. When first opened, pixels in the pixel band have not registered light and all pixels in the pixel bands are shown "blank". Photosurface 22 and pixel band 58 are also schematically represented after accumulating light during a plurality of gates 48 from a plurality of corresponding reflected pulses 45, and at a time at which timing information acquired by pixels in the pixel band is to be read during a read time, to the right of a last "n-th" gate 48, activated with respect to a light pulse 33 transmitted at time $T_n$. The accumulated timing information relating to a portion of scene 36 imaged on pixels of pixel band 58 is schematically represented by shading of the pixel band.

As noted above, gating of rolling shutter photosurface 24 is illustrated along time line 43. As indicated in the time line, after a predetermined time 60 following transmission of a first light pulse 33 at time $T_1$, controller 30 gates on global shutter 124 at a time $T_{Y1}$ to gate on photosurface 24 for a second, optionally "normalization" gate 62 having a gate width 64. Shaded region 66 inside gate 62 schematically represents IR light 33 and visible RGB light 34 captured from reflected light pulses 45 during the gate. Region 66 comprises IR background and visible RGB light 67, and light 68 from reflected light pulses 45. Graphically, reflected light 68 is an intersection of reflected light pulses 45 with normalization gate 62. Width of normalization gate 64 is sufficiently large so that substantially all light from all reflected light pulses 45 that reach 3D imaging system 20 from regions of scene 36 imaged on photosurface 24 that is directed to photosurface 24 during normalization gate 62 is registered on pixels in pixel band 58 of photosurface 24. Similar to photosurface 22, photosurface 24 and its pixel band 58 are schematically shown to the left of gate 62, just after the pixel band is opened and before its pixels have registered light, and to the right of gate 62, after registering light and just before its pixels are to be read. Normalization data acquired by pixel band 58 is read during a read time of the pixel band after the pixel band is closed.

It can be appreciated that the first use of predetermined time 46, at which time timing gate 48 is initiated, and predetermined time 60, at which time normalization gate 62 is initiated, are both measured with respect to the same start time $T_1$ of the first IR light pulse 33. Accordingly, in accordance with an embodiment of the invention, 3D imaging system 20 gates photosurfaces 22 and 24 and opens pixel bands in the photosurfaces so that homologous bands on the two photosurfaces register light and respectively acquire both, timing and normalization data, simultaneously from same illuminating IR light pulses 33. The above process is repeated, with each rolling shutter photosurface sequentially exposing homologous pixel bands of its array of pixels each time until substantially all of the area of each photosurface has been exposed.

FIG. 4 shows a sample repetition of the process in which a pixel band 59 of each photosurface is exposed. Controller 30 keeps track of which part of a photosurface has been exposed and which part remains to be exposed. It is noted that controller 30 of 3D imaging system 20 generally turns on bands 59 in photosurfaces 22 and 24 following a delay substantially equal to a read time of the pixel bands after pixel bands 58 are opened. It is therefore noted that, generally, different pixel bands are open at same times and that therefore pixels in different bands of pixels in the photosurfaces acquire timing and normalization data simultaneously responsive to same light pulses 33.

The acquisition of background light data in accordance with an embodiment of the invention is also illustrated in FIGS. 3 and 4. Optionally, after timing and normalization data is acquired, (i.e. after frames of timing and normalization data are acquired from the photosurfaces), at a time $T_{Xb}$ following transmission of light pulses 33, when substantially no light from pulses 33 is incident on 3D imaging system 20, controller 30 controls global shutter 122 to gate on and off photosurface 22, for a "background" gate 72, and opens pixel band 58 to register light during the gate. Optionally, gate 72 has a gate width 74 equal to n times gate width 50 of timing gates 48, i.e. n×T, where n is a number of timing gates that occur when a band of pixels is open to acquire timing information. Light registered by a pixel in pixel band 58 of photosurface 22 during gate 72 is schematically represented by a shaded region 76 in the gate. Similarly, at a time $T_{Yb}$, shutter 124 gates on photosurface 24 and opens pixel band 58 so that the band of pixels receives light during a background gate 80 optionally having a gate width 64 equal to that of normalization gate 62. During gate 80, pixels in pixel band 58 of photosurface 24 register light schematically represented by a shaded band 84 in the gate. Optionally, gate 72 and gate 80 are substantially simultaneous.

There is no IR light from a reflected light pulse 45 during background gates 72 and 80. Accordingly, substantially all light 76 registered during gate 72 is IR background light from scene 36 and substantially all light 84 registered during gate 80 is IR background light and visible RGB light from scene 36. FIG. 4 similarly shows the acquisition of background light for exposed pixel band 59 of each photosurface.

Following acquisition of timing, normalization, and background data for all pixel bands of photosurfaces 22 and 24, a depth map and picture of scene 36 in accordance with an embodiment of the invention is determined. Four sets of data have been acquired for each pair of homologous pixels in photosurfaces 22 and 24:

(1) IR light 52 incident on pixels of photosurface 22 during timing gates 48;
(2) RGB+IR light 66 incident on photosurface 24 during normalization gates 62;
(3) IR light 76 incident on photosurface 22 during background gates 72; and
(4) RGB+IR light 84 incident on photosurface 24 during background gates 80.

In an embodiment of the invention, 3D imaging system 20 determines a distance "D" to a feature of scene 36 imaged on a given pair of pixels on photosurfaces 22 and 24 using the quantities of light "(1)" to "(4)", noted above, registered for the photosurfaces. Optionally, a distance to a feature of scene 36 is determined responsive to a quotient Q, defined by an expression:

$$Q = \frac{(1)-(3)}{(2)-(4)}. \quad (1)$$

The above expression (1) for Q assumes that gate width 50 (FIGS. 3 and 4) of short gate 48 is equal to pulse width T of pulses 33 and that background gate 74 has a gate width equal to nT, where, as noted above, "n" is equal to a number of short gates 48 that occur while a band of pixels, e.g. band 58 or 59 (FIG. 3) is maintained open. Expression (1) also assumes that background gate 80 and normalization gate 62 have a same gate width equal. For gate widths that do not meet the conditions noted in the preceding two sentences, the expression for Q has to be changed to normalize accumulated charges to same length exposure times.

Distance D to the feature imaged on the pair of pixels is determined in an embodiment of the invention in accordance with an expression of the form:

$$D = \frac{c}{2}(T_{46} - T) \pm \frac{c}{2}QT, \quad (2)$$

where c is the speed of light, and $T_{46}$ represents the predetermined delay time interval 46 between a time at which a light pulse 33 is transmitted and a short gate 48 begins. With respect to the ±sign in expression (2), the minus sign is used if last photons in a light pulse 33 are received during a short gate 48 and the plus sign is used if first photons in the light pulse are received during the gate. Various gating methods known in the art, such as optionally gating methods described in PCT application PCT/IL2007/001571, the disclosure of which is incorporated herein by reference, may be used in the practice of the invention to determine when the "+" or "−" is to be used.

In accordance with an embodiment of the invention, an RGB image of scene 36 is provided responsive to amounts of light registered by the pixels in photosurface 24. Optionally, RGB intensity "$I_{RGB}$" of a given pixel in the RGB image of scene 36 is, $$I_{RGB}=(4)-(3)[\text{gate width } 64/\text{gate width } 74], \quad (3)$$

which becomes $$I_{RGB}=(4)-(3) \quad (4)$$

for the conditions under which expression (1) for Q applies.

3D video imaging of a scene is optionally provided by system 20. Generally, real time 3D imaging requires providing at least thirty depth maps and corresponding images of the scene per second. To provide this rate, at least sixty frames of data have to be acquired per second from each of photosurface 22 and photosurface 24, so that a frame acquisition time for the photosurfaces must be less than about 16 ms. The noted frame acquisition times are well within the capabilities of conventional off the shelf rolling shutter photosurfaces.

In the description and claims of the application, each of the words "comprise", "include", and "have", and forms thereof, are not necessarily limited to members in a list with which the words may be associated.

The invention has been described using various detailed descriptions of embodiments thereof that are provided by way of example and are not intended to limit the scope of the invention. The described embodiments may comprise different features, not all of which are required in all embodiments of the invention. Some embodiments of the invention utilize only some of the features or possible combinations of the features. Variations of embodiments of the invention that are described and embodiments of the invention comprising different combinations of features noted in the described embodiments will occur to persons with skill in the art. It is intended that the scope of the invention be limited only by the claims and that the claims be interpreted to include all such variations and combinations.

The invention claimed:

1. A 3D imaging system, comprising:
first and second rolling shutter photosurfaces comprising pixels;
a first shutter operable to gate on and off the first rolling shutter photosurface;
a light source controllable to transmit a train of infrared light pulses to illuminate a scene;
a controller that controls the first shutter to gate the first rolling shutter photosurface on and off responsive to transmission times of the light pulses and opens and closes bands of pixels in the first and second rolling shutter photosurfaces to register reflected light, the reflected light is reflected from the light pulses by the scene; and
a processor that determines distances to the scene responsive to amounts of light registered by pixels in the first and second rolling shutter photosurfaces, wherein the first and second rolling shutter photosurfaces comprise respective arrays of pixels, the first rolling shutter registers substantially only infrared light from the scene, and the second rolling shutter photosurface registers infrared and RGB light from the scene.

2. The 3D imaging system according to claim 1, wherein:
the controller opens and closes homologous bands of pixels in the first and second rolling shutter photosurfaces to register reflected light that reaches the 3D imaging system from same transmitted light pulses.

3. The 3D imaging system according to claim 1, wherein: the controller controls the first shutter to gate on and off the first rolling shutter photosurface, and turns on and off bands of pixels in the first rolling shutter photosurface to register light from the scene during periods of time for which reflected light from the light pulses does not reach the 3D imaging system.

4. The 3D imaging system according to claim 3, wherein: the processor determines a distance to a region of the scene responsive to an amount of the reflected light which is from the region and registered by the first rolling shutter photosurface minus an amount of light registered by the first rolling shutter photosurface during a period of time for which reflected light from the light pulses does not reach the 3D imaging system.

5. The 3D imaging system according to claim 3, wherein: the controller turns on and off bands of pixels in the second rolling shutter photosurfaces to register light from the scene during periods of time for which reflected light from the light pulses does not reach the 3D imaging system.

6. The 3D imaging system according to claim 5, wherein: the controller turns on and off homologous bands of pixels in the first and second rolling shutter photosurfaces to register light from the scene during same periods of time for which reflected light from the light pulses does not reach the 3D imaging system.

7. The 3D imaging system according to claim 5, wherein: the processor provides an image of the scene responsive substantially only to an amount of light from the scene registered by the second rolling shutter photosurface during periods of time for which reflected light from the light pulses does not reach the 3D imaging system minus an amount of light registered by the first rolling shutter photosurface during periods of time for which reflected light from the light pulses does not reach the 3D imaging system.

8. The 3D imaging system according to claim 1, wherein: the controller turns on and off bands of pixels in the second rolling shutter photosurface to register light from the scene during periods of time for which reflected light from the light pulses does not reach the 3D imaging system.

9. The 3D imaging system according to claim 8, wherein: the processor provides an image of the scene responsive substantially only to an amount of light from the scene registered by the second rolling shutter photosurface during periods of time for which light from the light pulses does not reach the 3D imaging system.

10. The 3D imaging system according to claim 8, wherein: the processor determines a distance to a region of the scene responsive to an amount of the reflected light which is from the region and registered by the second rolling shutter photosurface minus an amount of light registered by the second rolling shutter photosurface during periods of time for which light from the light pulses does not reach the 3D imaging system.

11. The 3D imaging system according to claim 1, further comprising:
a second shutter operable to gate on and off the second rolling shutter photosurface.

12. The 3D imaging system of claim 1, further comprising:
optics which direct half of the reflected light to each of the first and second rolling shutter photosurfaces.

13. The 3D imaging system according to claim 1, further comprising:
a second shutter operable to gate on and off the second rolling shutter photosurface; wherein:
the controller controls the first shutter to gate on and off the first rolling shutter photosurface responsive to times at which the light pulses in the train of light pulses are transmitted to register the reflected light; and
the controller controls the second shutter to gate on the second rolling shutter photosurface for a period which extends over multiple light pulses of the train of light pulses.

14. The 3D imaging system according to claim 1, further comprising:
an infrared filter in front of the first rolling shutter photosurface but not in front of the second rolling shutter photosurface.

15. A method of 3D imaging a scene, the method comprising:
transmitting a train of infrared light pulses to illuminate the scene;
gating a first rolling shutter photosurface on and off responsive to times at which light pulses in the train of light pulses are transmitted to register reflected light, the reflected light is reflected from the light pulses by the scene, wherein the first rolling shutter photosurface comprises a respective array of pixels and registers substantially only infrared light from the scene;
imaging the scene with a second rolling shutter photosurface comprising a respective array of pixels, wherein the second rolling shutter photosurface registers infrared and RGB light from the scene; and
using light registered by the first rolling shutter photosurface and the second rolling shutter photosurface to provide a depth map of the scene and an image of the scene.

16. The method according to claim 15, wherein:
the first and second rolling shutter photosurfaces are homologous such that pixels corresponding to a same relative position on each of the first and second rolling shutter photosurfaces receive the reflected light from substantially a same region of the scene.

17. The method according to claim 15, further comprising:
gating the second rolling shutter photosurface on over for a period which extends over multiple light pulses of the train of light pulses.

18. The method according to claim 15, further comprising:
opening and closing homologous bands of pixels in the first and second rolling shutter photosurfaces to register the reflected light.

19. The method according to claim 18, further comprising:
turning on and off homologous bands of pixels in the first and second rolling shutter photosurfaces to register light from the scene during same periods of time for which light from the light pulses does not reach the 3D imaging system.

20. The method according to claim 15, further comprising:
directing half of the reflected light to each of the first and second rolling shutter photosurfaces.

* * * * *